Figure 1:
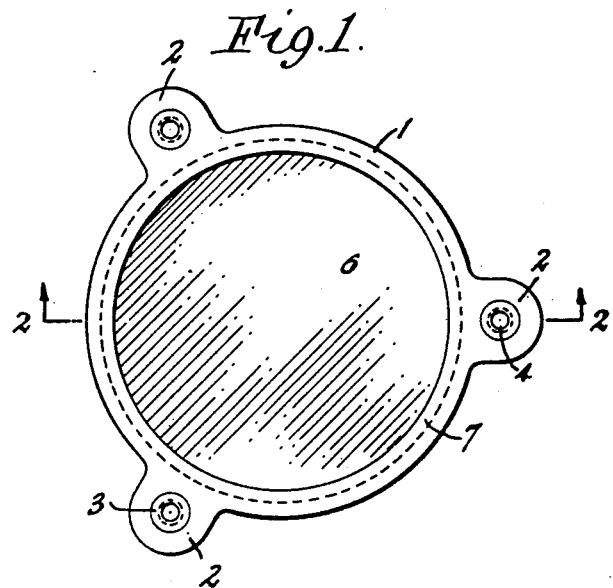

Sept. 28, 1943.    A. H. BENNETT ET AL    2,330,663
TELESCOPE OBJECTIVE AND METHOD OF MAKING SAME
Filed Sept. 12, 1940

INVENTORS
ALVA H. BENNETT
BY ROGER S. ESTEY

ATTORNEY

Patented Sept. 28, 1943

2,330,663

UNITED STATES PATENT OFFICE 2,330,663

TELESCOPE OBJECTIVE AND METHOD OF MAKING SAME

Alva H. Bennett, Kenmore, and Roger S. Estey, Buffalo, N. Y., assignors to Spencer Lens Company, Buffalo, N. Y., a corporation of New York Application September 12, 1940, Serial No. 356,482

6 Claims. (Cl. 88—57)

This invention relates to new and useful improvements in telescope objectives or the like, and to a new and improved method of making the same.

An object of the invention is to provide a new and improved telescope objective or the like formed of an isotropic, non-frangible, plastic composition which will be efficient and economical to manufacture.

Another object of the invention is to provide a lens of the type set forth which may be formed substantially integral with its retaining ring and thereby be simple and efficient of construction and economical to manufacture.

Another object of the invention is to provide a device of the type set forth having the glass and metal elements secured thereto during the forming of the device.

Another object of the invention is to provide a new and improved telescope objective or the like made of a plastic composition and having a glass element and having metal retaining lugs secured thereto, said glass element and metal retaining lugs being secured to said objective during the forming or molding thereof.

Another object of the invention is to provide a new and improved method of forming telescope objectives or the like of plastic material.

Another object of the invention is to provide a new and improved method of forming telescope objectives or the like of a plastic and having a glass element.

Another object of the invention is to provide a new and improved method of forming a telescope objective or the like and its retaining ring of plastic material and a glass element and having metal retaining lugs, said glass element and metal retaining lugs being secured to said objective and retaining ring during the molding thereof.

Figure 2:
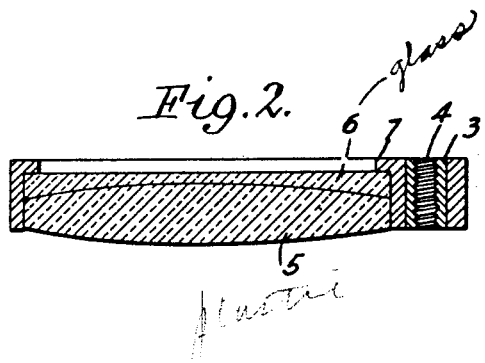

Referring to the drawing:

Fig. 1 is a front view of a telescope objective and retaining ring embodying the invention; and Fig. 2 is a sectional view taken on line 2—2 of Fig. 1.

In the past it has been customary to form telescope objectives or similar lenses by grinding the surfaces of a plurality of glass lens elements then securing said lens elements together by cementing them along their adjacent faces and then securing the combined lens structure in a retaining ring. This construction was necessarily expensive due to the precision with which it was necessary to form the lens surfaces and retaining ring, and therefore made the cost of the objective very expensive.

Due to the optical properties of the combined lens elements, it has not been possible to mold the entire element from a single plastic composition. One of the principal reasons for this was that the achromatic or color free qualities of the flint glass lens element could not be duplicated in a plastic composition.

It is therefore one of the principal objects of this invention to provide a new and improved telescope objective which may be quickly and economically made from a plastic composition in combination with a glass element, and which may also have the retaining ring formed integral with said objective making the said objective economical to manufacture, and to provide a new and improved method of making such a device.

Referring more particularly to the drawing wherein similar reference characters designate corresponding parts throughout the several views, the structure shown in Fig. 1 comprises the retaining ring 1 having the integral projecting lugs 2 thereon, each of which retaining lugs 2 carries a tapped metal insert 3 having the tapped central bore 4 adapted to receive screws or the like to retain the objective in position on the telescope or other instrument.

The ring 1, lugs 2 and lens element 5 are formed integral of a plastic and are made by molding by any of the many well known processes of molding plastics now in use. The lens 6 is of glass, and preferably of a flint glass of the type now used in telescope objectives. This flint glass element makes the lens achromatic or color free. This glass element 6 may be of any other suitable glass.

The ring 1 is formed with the integral flange 7 which fits over and serves to retain the glass element 6 in its assembled relation with the ring 1 and lens element 5.

The device is formed by molding the lens 6 and tapped inserts 3 into the plastic ring 1 and lens 5 by the use of suitable dies in a plastic molding press. The said dies have highly polished surfaces to provide surfaces of good quality on the finished composite lens.

The plastic materials of which the ring 1, lugs 2 and lens element 5 are made may be of any of the plastic compositions now on the market and known by their various trade names, such as Plexiglas, Lucite, Metastyrol, Bakelite, Catalin, Marblette or Fiberlon, etc.

Other materials that may be used are polymerized vinyl acetate, vinyl chloride, mixed polymer of vinyl acetate and vinyl chloride. These may be plasticized with di-butoxy-ethyl-phthalate, halogenated diphenyl, or other known compatible plasticizers. Polymerized methyl methacrylate may be employed and plasticized with non-volatile plasticizing agents such as dibutyl phthalate. In general, the plastic elements are to be preferably made of a polymerized product of an unsaturated alkyl compound and may be plasticized with a nonvolatile compatible plasticizing agent such as dibutyl phthalate, etc.

The glass lens element 6 and the metal inserts 3 are preferably supported in a mold between dies having a portion of their surfaces of the curvature desired on the finished plastic lens element and other portions adapted to form an article of the shape desired of the finished article, and then the plastic material may be inserted in the mold in powder or sheet form as desired. Then by means of heat and pressure of the mold, the dies are adapted to form the completed article and secure the glass lens element 6 and metal inserts 3 in substantially integral relation with the plastic material.

It will be seen that an objective formed as outlined above will be light and economical of manufacture and yet have the desirable achromatic properties of glass objectives and have the tapped metal inserts for readily securing to an instrument.

From the above it will be seen that we have provided simple, efficient and economical means and method of carrying out all the objects of the invention, namely, of making a telescope or similar objective of composite glass and plastic elements and having metal securing portions.

Having described our invention, we claim:

1. An objective comprising a lens element formed of lens medium of a given index of refraction having finished optical surfaces on the opposed sides thereof of related curvature controlled according to the index of refraction of the lens medium to introduce in part the resultant focal power desired of the objective, a second lens element of a transparent plastic lens medium having a lower melting point than said first lens element and having a surface of a curvature controlled by and in intimate relation with one of the surfaces of the first lens element and having a surface on the opposed side thereof of a curvature controlled according to the index of refraction of said plastic lens medium and the surfaces of the first lens element to introduce the resultant focal power desired of the objective, an integral peripheral support on said second lens element extending about the second lens element and having a portion overlying the outer side surface of said first lens element to retain said elements in assembled relation with each other.

2. The method of forming an objective comprising forming a lens element of a lens medium of a given index of refraction having finished optical surfaces on the opposed sides thereof of related curvature controlled according to the index of refraction of the lens medium to introduce in part the resultant focal power desired of the objective, forming a second lens element of a transparent plastic lens medium having a lower melting point than said first lens element and having a surface of a curvature controlled by and in intimate relation with one of the surfaces of the first lens element and having a surface on the opposed side thereof of a curvature controlled according to the index of refraction of said plastic lens medium and the surfaces of the first lens element to introduce the resultant focal power desired of the objective and forming an integral peripheral support on said second lens element extending about said second lens element and having a portion overlying the outer side of said first lens element to retain said elements in assembled relation with each other.

3. In a device of the character described, a body portion and a lens element formed integral with said body portion, said lens element and body portion being of a transparent plastic lens medium, said body portion having integral retaining means adjacent an edge thereof, said lens element having finished optical surfaces on the opposite sides thereof, and a separate optical element having a higher melting point than said first lens element and having finished optical surfaces on the opposite sides thereof, and having a portion engaging said retaining means and having one of said finished surfaces in contact with one of the finished surfaces on said plastic lens element to retain said lens elements in operative relation and the curvature of the surface of said plastic lens which is in contact with a surface of said optical element having a higher melting point being controlled by the curvature of said surface.

4. In a device of the character described, a body portion and a lens element formed integral with said body portion, said lens element and body portion being of a transparent plastic lens medium, said body portion having integral retaining means adjacent the edge thereof, said lens element having finished optical surfaces on the opposite sides thereof, and a separate glass optical element having a higher melting point than said first lens element and having finished optical surfaces on the opposite sides thereof, and having a portion engaging said retaining means and having one of said finished surfaces secured in contact with one of the finished surfaces on said plastic lens element to retain said lens elements in operative relation with the curvature of the surface of the plastic lens element in contact with the glass lens element being controlled by the curvature of the contacting surface of said glass lens element.

5. The method of forming an optical unit comprising forming finished optical surfaces on the opposed surfaces of a lens element of material having a relatively high melting point, placing said lens element in a mold, molding an integral plastic member having a body and lens element and integral retaining means adjacent an edge thereof with said plastic lens element having finished opposite surfaces with one of said surfaces in contact with one of the finished optical surfaces of said lens element and a portion of its other surface in contact with said integral retaining means, said plastic lens element and integral retaining means having a lower melting point than said first lens element.

6. The method of forming an optical unit comprising forming finished optical surfaces on the opposed surfaces of a glass lens element, placing said glass lens element in a mold, molding an integral plastic member having a body and lens element and integral retaining means adjacent an edge thereof with said plastic lens element having finished opposite surfaces with one of said surfaces in contact with one of the finished optical surfaces of said glass lens element and controlled by the curvature of the surface of said glass lens element and a portion of its other surface in contact with said integral retaining means on said body.

ALVA H. BENNETT.
ROGER S. ESTEY.